US006951392B2

(12) United States Patent  
Jones (10) Patent No.: US 6,951,392 B2
(45) Date of Patent: Oct. 4, 2005

(54) LENS HAVING AT LEAST ONE LENS CENTRATION MARK AND METHODS OF MAKING AND USING SAME

(75) Inventor: Edward L. Jones, Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/615,663

(22) Filed: Jul. 9, 2003

(65) Prior Publication Data

US 2005/0007547 A1 Jan. 13, 2005

(51) Int. Cl.$^7$ .............................................. G02C 7/02
(52) U.S. Cl. ...................................................... 351/177
(58) Field of Search ............................ 351/177–8, 159; 359/440–2, 642; 356/124, 127

(56) References Cited

U.S. PATENT DOCUMENTS

| | | | |
|---|---|---|---|
| 3,737,238 A | 6/1973 | Reiner et al. | ............... 356/401 |
| 4,257,692 A | 3/1981 | Le Naour-Sene | ........... 359/159 |
| 4,615,847 A | 10/1986 | Howden | ..................... 264/1.7 |
| 5,151,870 A | 9/1992 | Beebe et al. | ................ 702/168 |
| 5,224,272 A | 7/1993 | Toraason et al. | .............. 33/504 |
| 5,253,038 A | * 10/1993 | Bouwhuis et al. | .......... 356/492 |
| 5,309,283 A | 5/1994 | Kreitzer | ...................... 359/649 |
| 5,389,774 A | 2/1995 | Gelman et al. | .......... 250/201.1 |
| 5,402,192 A | 3/1995 | Gelman | ........................ 353/78 |
| 5,402,193 A | 3/1995 | Choate | ........................ 353/80 |
| 5,503,694 A | * 4/1996 | Abrams | ........................ 156/64 |
| 5,523,583 A | 6/1996 | Choate | .................. 250/559.19 |
| 5,619,031 A | 4/1997 | Choate | .................... 250/201.2 |

(Continued)

FOREIGN PATENT DOCUMENTS

| | | |
|---|---|---|
| EP | 0 947 872 A1 | 10/1999 |
| EP | 0 949 528 A2 | 10/1999 |
| EP | 1 158 339 A1 | 11/2001 |
| WO | WO 02/43370 | 5/2002 |

OTHER PUBLICATIONS

"OGP Avant Apex Video Measuring System", OpticalGaging Products, Inc., [retrieved from the internet on Jun. 11, 2003], URL <http://ogpnet.com/apex.htm>, pp. 2.

"Melles Griot Optics GuideCentration", Melles Griot, [retrieved from the internet on Apr. 25, 2003], URL <http://mellesgriot.com/products/optics/os_3.htm>, pp2.

Magarill, Simon, "Optomechanical Sensitivity and Tolerancing", 3M Preicision Optics, Inc., Cincinnati, Ohio, [retrieved from the internet on Apr. 25, 2003], URL <http://www.3mprecisionoptics.com/>, pp 9.

Moskovich et al. "CRT Projection Optics" (Seminar presented to the Society for Information Display (SID) in Anaheim, CA on May 6, 1991), 3M Preicision Optics, Inc., Cincinnati, Ohio, [retrieved from the internet on Apr. 25, 2003], URL <http://www.3mprecisionoptics.com/>, pp 40.

The Handbook of Plastic Optics, Second Edition, US Precision Lens, Inc., Cincinnati, Ohio, 1983.

Karow, "Fabrication Methods for Precision Optics", 1993, John Wiley & Sons, Inc., USA, XP002310437, pp. 530–531, pp. 538–541.

Primary Examiner—Jordan M. Schwartz
Assistant Examiner—Jessica Stultz
(74) Attorney, Agent, or Firm—Jay R. Pralle (57) ABSTRACT

A lens having at least one lens centration mark formed on a major surface of the lens is disclosed. The lens centration mark may be located at the intersection of a first axis and the major surface, where the major surface is symmetrical about the first axis such that the first axis is an axis of revolution of the surface. A method of making a lens having such lens centration mark, as well as a method for measuring the centration of a lens surface utilizing the lens centration mark, are also disclosed.

13 Claims, 6 Drawing Sheets

U.S. PATENT DOCUMENTS

| | | | |
|---|---|---|---|
| 5,668,665 A | 9/1997 | Choate | 359/663 |
| 5,690,417 A | 11/1997 | Polidor et al. | 362/244 |
| 5,711,610 A | 1/1998 | Deck | 384/49 |
| 5,832,107 A | 11/1998 | Choate | 382/154 |
| 5,835,208 A | 11/1998 | Hollmann et al. | 356/124 |
| 5,897,195 A | 4/1999 | Choate | 362/33 |
| 5,993,009 A | 11/1999 | Choate | 353/80 |
| 6,072,569 A * | 6/2000 | Bowen | 356/124 |
| 6,161,940 A | 12/2000 | Choate et al. | 362/235 |
| 6,179,439 B1 | 1/2001 | Choate | 362/247 |
| 6,222,621 B1 * | 4/2001 | Taguchi | 356/124 |
| 6,292,306 B1 | 9/2001 | Betensky | 359/663 |
| 6,362,882 B1 | 3/2002 | Choate et al. | 356/397 |
| 6,488,398 B1 | 12/2002 | Bloch et al. | 362/575 |
| 6,507,705 B1 | 1/2003 | Kasha | 396/72 |
| 6,518,996 B1 | 2/2003 | Polidor et al. | 348/95 |

* cited by examiner

LENS HAVING AT LEAST ONE LENS CENTRATION MARK AND METHODS OF MAKING AND USING SAME

FIELD OF INVENTION

The present invention relates generally to the field of lenses, and in particular to a lens having at least one centration mark and methods of making and using same.

BACKGROUND

Optical elements often require testing to determine optical and mechanical characteristics. For example, it is often necessary to test a lens for centration of one or both of a lens's surfaces.

Increasingly, lens designers have turned to aspherical surfaces to help control various types of optical aberrations that may occur in lenses having spherical surfaces. In general, an aspherical surface is considered to be shaped to a surface of revolution that is formed by rotating a noncircular curved shape about an axis of revolution. The surface of revolution is then rotationally symmetrical about the axis of revolution. Each aspherical surface that is a surface of revolution includes a vertex that is defined as the point on the surface where the surface intersects the axis of revolution.

Aspherical lenses provide various advantages over more spherical surfaces. For example, an aspheric lens may have a much shorter focal length than is possible with a spherical lens of the same diameter. This short focal length may be a useful feature where space is limited. A single aspherical lens may also be used as a condenser lens. In multilens systems, aspherics may help to correct aberrations.

Various improvements in lens design have also led to improvements in lens manufacturing as well. For example, injection molding of optical grade polymeric materials allows for the production of mass-produced high-quality optics that are made using lower-cost materials.

Plastic optics have a number of advantages over glass. Foremost of these are lower cost, higher impact resistance, lighter weight, and more configuration possibilities for simplifying system assembly. Configuration flexibility is especially useful in systems that use aspherical lenses to simplify system design and reduce parts count, weight, and cost. Moreover, light transmittance can be comparable to that of high-grade crown glasses. Finally, the plastics that can break generally do not splinter like glass. The fragments are larger and tend to be more obtuse and less hazardous.

Virtually all glass optic grinding and polishing equipment employs mechanisms that utilize mechanical movements for contouring spherical surfaces. Traditionally, finishing the optical pins of a mold for injection and compression-molding has been performed with a similar process. Hence, most optics produced have been spherical.

However, optical designers are using aspheres increasingly to reduce costs or to obtain performance unavailable using other techniques. Designs using aspheres often contain fewer elements. Further, the complex process of producing a precise aspherical mold cavity surface is required only once for each cavity. Consequently, the injection molding process is an economical technique for exploiting the advantages of aspheres.

However, various errors can occur during injection molding of aspherical lens surfaces that can produce surfaces that are decentered. For example, the optical axis of the surface may not be coincident with the mechanical axis of the lens. For example, the two mold pins that make up an injection mold may not be properly aligned with each other such that one or both lens surface's optical axes are not coincident with the mechanical axis of the lens. In addition, the curable material used in the injection molding process may unevenly shrink during curing.

SUMMARY

The present invention provides a lens that includes a first lens centration mark located at a vertex of a major surface of the lens. The first lens centration mark can allow for more accurate measurement of the centration of the major surface to the lens's mechanical axis. In some embodiments of the present invention, the lens can also include a second lens centration mark located on a second major surface of the lens.

The present invention further provides methods for measuring the centration of a lens surface.

Among the advantages provided by some embodiments of the present invention is that a lens centration mark may be used with any shape of optical surface and provides an accurate and easily reproducible way of measuring centration.

In one aspect, the present invention provides a lens having a first major surface and a second major surface. The first major surface is rotationally symmetrical about a first axis. The first major surface includes a first lens centration mark located at the intersection of the first major surface and the first axis. In some embodiments, the lens also includes a second major surface of the lens that is rotationally symmetrical about a second axis. The second major surface of the lens includes a second lens centration mark located at the intersection of the second major surface and the second axis.

In another aspect, the present invention provides a method of forming a lens centration mark on at least one surface of a lens. The method includes forming a first mold centration mark on a first surface of a lens mold, where the first surface is rotationally symmetrical about a, first lens mold axis. The first mold centration mark is formed at the intersection of the first lens mold axis and the first surface of the lens mold. The method further includes filling the lens mold with a curable material, and curing the material such that the first mold centration mark forms a first lens centration mark on a first major surface of the lens. In some embodiments, the method also includes forming a second mold centration mark on a second surface of the lens mold, where the second surface is rotationally symmetrical about a second lens mold axis. The second mold centration mark is formed at the intersection of the second lens mold axis and the second surface of the lens mold. Curing the material further includes curing the material such that the second mold centration mark forms a second lens centration mark on a second major surface of the lens.

In another aspect, the present invention provides a method of measuring centration of a lens. The method includes placing the lens on a platen, where the lens includes a first major surface and a second major surface. The first major surface is rotationally symmetrical about a first axis. The first major surface includes a first lens centration mark located at the intersection of the first major surface and the first axis. Placing the lens on the platen includes placing the lens on the platen such that the first lens centration mark is aligned with a rotation axis of the platen. The method further includes leveling the lens relative to a plane of rotation that is orthogonal to the rotation axis of the platen; rotating the lens about the rotation axis of the platen; and observing the lens during or after rotation to assess centration of the first major surface of the lens.

In some embodiments, the method further includes repositioning the lens on the platen such that a second lens centration mark on a second major surface of the lens is aligned with the rotation axis of the platen. The second major surface of the lens is rotationally symmetrical about a second axis. The second lens centration mark is located at the intersection of the second major surface and the second axis. The method further includes rotating the lens about the rotation axis of the platen, and observing the lens during or after rotation to assess centration of the second major surface of the lens.

In another aspect, the present invention provides a method of measuring centration of a lens. The method includes placing the lens on a platen in a first lens position, where the lens includes a first major surface and a second major surface. The first major surface is rotationally symmetrical about a first axis. The first major surface includes a first lens centration mark located at the intersection of the first major surface and the first axis. The method further includes determining a first location of the first lens centration mark when the lens is in the first lens position; positioning the lens in a second lens position; determining a second location of the first lens centration mark when the lens is in the second lens position; and comparing the first location of the first lens centration mark and the second location of the first lens centration mark.

In some embodiments, the method further includes determining a first location of a second lens centration mark on a second major surface of the lens when the lens is in the first lens position, where the second major surface of the lens is rotationally symmetrical about a second axis. The second lens centration mark is located at the intersection of the second major surface and the second axis. The method further includes positioning the lens in the second lens position; determining a second location of the second lens centration mark when the lens is in the second lens position; and comparing the first location of the second lens centration mark and the second location of the second lens centration mark.

These and other features and advantages of lenses according to the present invention may be discussed below with respect to various illustrative embodiments of the invention as defined by the claims.

DETAILED DESCRIPTION OF ILLUSTRATIVE EMBODIMENTS OF THE INVENTION

In the following detailed description of illustrative embodiments, reference is made to the accompanying drawings that form a part hereof, and in which are shown, by way of illustration, specific embodiments in which the invention may be practiced. It is to be understood that other embodiments may be utilized and structural changes may be made without departing from the scope of the present invention.

In general, the lenses of the present invention include at least one lens centration mark on a major surface of the lens.

As used herein, the term "aspherical lens" refers to a lens in which at least one surface of the lens is shaped to a non-spherical surface of revolution about an axis of revolution.

As used herein, the term "vertex" refers to a point on a surface of revolution where the axis of revolution intersects the surface of revolution.

As used herein, the term "optical axis" refers to an axis that passes through the vertex of a lens surface and is coincident with the axis of revolution for that particular surface.

As used herein, the term "geometrical center of a lens" refers to the intersection of the midpoint of the diameter of a lens and the midpoint of the thickness of the lens.

As used herein, the term "lens centration mark" refers to a mark or feature formed in or on a surface of a lens such that the lens centration mark is located at the intersection of the surface and the axis of revolution of that surface. In other words, the lens centration mark is located at the vertex of the surface of revolution.

As used herein, the term "decentration" refers to any lack of coincidence between the optical and mechanical axes. For a perfectly centered lens surface, the mechanical axis of the lens is coincident with the optical axis. For surfaces having a lens centration mark, decentration of the surface would be indicated if the lens centration mark is not aligned with the mechanical axis of the lens.

Figure 1A:
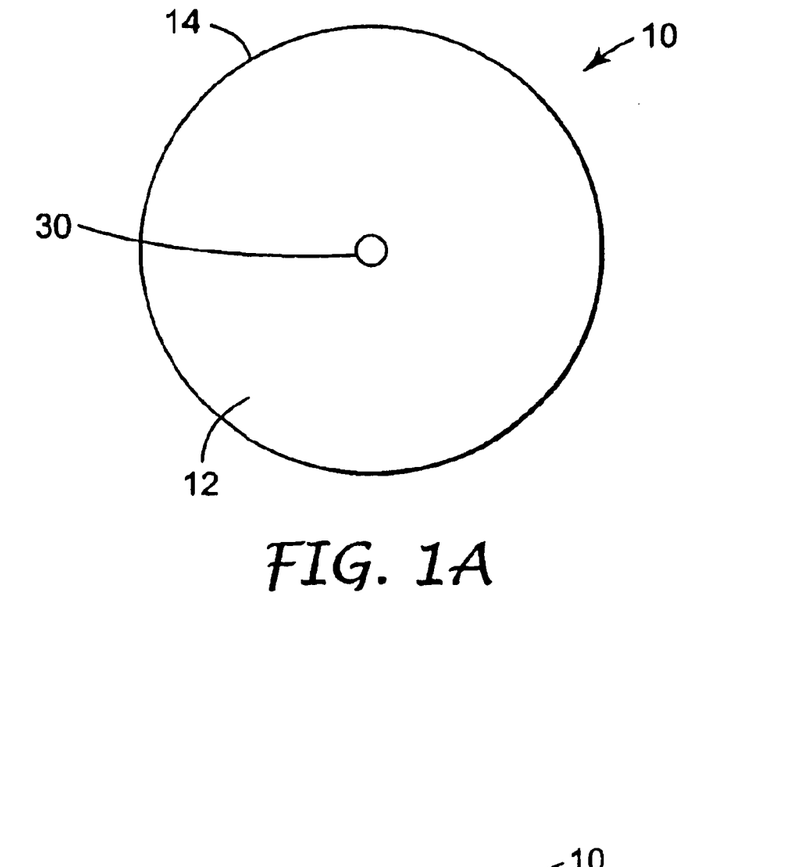
FIG. 1A is a schematic plan view of one lens having a lens centration mark according to the present invention.
Figure 1B:
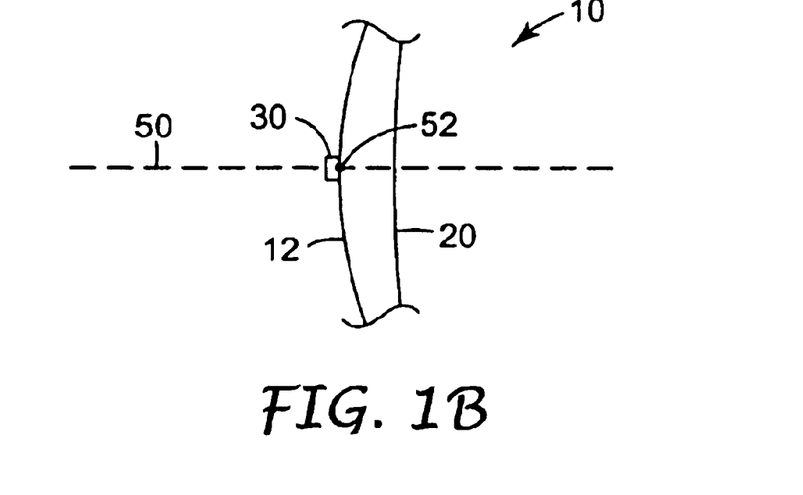
FIG. 1B is a schematic cross section view of a portion of the lens of FIG. 1B.

FIGS. 1A–1B illustrate one embodiment of a lens 10 according to the present invention. Lens 10 includes a first major surface 12, a second major surface 20, and an outer edge 14. The first major surface 12 includes a lens centration mark 30 as further described herein. The lens centration mark 30 is not made to scale in FIGS. 1A–1B for illustrative purposes. Lens 10 may be any suitable type of lens known in the art, e.g., plano-convex, double convex, meniscus, plano-concave, double concave, or aspherical. Further, the lens 10 may be used in any number of types of devices and for various types of optical effects, e.g., microscopes, cameras, telescopes, projection televisions, glasses, data display projectors, and video display projectors.

The lens 10 may be made of any suitable material or combination of materials, e.g., glass, polymeric, or crystalline. Further, lens 10 may include various materials in the lens 10 or as coatings for providing various optical properties, e.g., anti-reflective, anti-scratch, anti-stain, etc.

Lens 10 may be any suitable size depending on its particular use. For example, 10 mm diameter lenses can be useful for some camera or projection lens assemblies. Alternatively, lenses that are approximately 200 mm in diameter can be useful for some television lens assemblies.

The outer edge 14 of lens 10 may take any suitable shape, e.g., circular, rectangular, etc. Further, the outer edge 14 may include one or more gate protrusions from the injection molding process (see, e.g., gate protrusion 418 of lens 410 of FIG. 7). In addition, lens 10 may include integral mounting and fastening features proximate the outer edge 14 for mounting the lens 10 in an optical assembly. For example, such fastening features may include square flanges, protrusions for heat staking, holes with mounting pads, etc. Further, lens 10 may include mounting flats for mounting in an optical assembly.

As mentioned above, lens 10 includes a first major surface 12, which may take any suitable shape depending upon the desired optical properties of the lens 10. For example, first major surface 12 may be convex, concave, or planar. Further, a convex or concave surface may take a spherical or aspherical shape. It may be preferred that first major surface 12 is generally symmetrical about a first axis 50. In other words, first major surface 12 may be described by rotating a selected non-circular curve about first axis 50 to form a surface of revolution. In the illustrated embodiment, the first axis 50 is an axis of revolution for describing the first major surface 12. In general, aspherical surfaces can be described as surfaces of revolution that are rotationally symmetrical about an axis of revolution. As illustrated in FIG. 1A, vertex 52 indicates where the first axis 50 (i.e., the axis of revolution for the first major surface 12) intersects the first major surface 12 (i.e., the surface of revolution).

Opposed from the first major surface 12 of lens 10 is the second major surface 20, which can take any suitable shape depending upon the desired optical properties of lens 10, e.g., convex, concave, planar. Further, a convex or concave surface may take a spherical or aspherical shape. As with the first major surface 12, the second major surface 20 may also be described as a surface of revolution.

The first major surface 12 includes a first lens centration mark 30. As illustrated in the figures of the present invention, lens centration marks are not drawn to scale for ease of illustration. The first lens centration mark 30 may be located at the intersection of the first major surface 12 and the first axis 50, i.e., at the vertex 52 of the first major surface 12. As used herein, the term "at" as used, e.g., in the phrase "located at the intersection of the first major surface 12 and the first axis 50" means that the first lens centration mark 30 is located exactly at the intersection of the first axis 50 and the first major surface 12 or within a required tolerance. The amount of tolerance will depend on the lens diameter. For example, a 200 mm lens with 25 $\mu$m tolerance is about 0.01% tolerance.

The first lens centration mark 30 may take any suitable shape, e.g., circular, triangular, rectangular, etc. Further, the first lens centration mark 30 may be any discontinuous arrangement of markings (e.g., cross-hair markings, bumps) having generally sharp edges such that the mark 30 may be distinguished from various lens defects. Further, the first lens centration mark 30 may be of any suitable size, i.e., height and diameter. For example, the first lens centration mark 30 may be less than 25 $\mu$m in height (or depth if mark 30 extends into the first major surface 12). It may be preferred that the first lens centration mark 30 may be less than 1 $\mu$m in height. Further, for example, the first lens centration mark 30 may be no more than 100 $\mu$m in diameter. It may be preferred that the first lens centration mark 30 is no more than 50 $\mu$m in diameter. It may be more preferred that the first lens centration mark 30 is no more than 25 $\mu$m in diameter. Alternatively, it may be preferred that the first lens centration mark 30 is smaller than various allowed defects, such as scratches or digs, for the particular lens's specifications. Further, it may be preferred that the first lens centration mark 30 does not substantially affect the optical performance of lens 10, while the first lens centration mark 30 is still of sufficient size such that a microscope can be focused onto mark 30 and be centered in the microscope's crosshairs as is further described herein. Further, it may be preferred that the lens centration mark 30 have a sharp edge such that a microscope or other optical device may more easily focus on the lens centration mark 30.

Although the first lens centration mark 30 is depicted in FIG. 1A as being a bump or protuberance that extends from the first major surface 12, the first lens centration mark 30 may also be a depression or dimple extending into the first major surface 12, or some combination of protruberance and depression.

The first lens centration mark 30 may be formed using any suitable technique known in the art. For example, the first lens centration mark 30 may be formed by engraving a corresponding mold centration mark on a surface of a mold pin used in an injection molding process as further described herein. Alternatively, the first lens centration mark 30 can be formed by embossing the first major surface 12 of lens 10. Further, for example, the first lens centration mark 30 may be formed by attaching the first lens centration mark 30 to the first major surface 12 of lens 10, e.g., by bonding the first lens centration mark 30 to the first major surface 12. Other techniques may include diamond turning, laser ablation, spot coating, etc.

Because it is located at the vertex 52 of the first major surface 12 of lens 10 (i.e., at the intersection of the first axis 50 and the first major surface 12), the first lens centration mark 30 along with the first axis 50 indicate the optical axis of the first major surface 12. As is further described herein, it is generally desirable that the optical axis of each surface of a lens be substantially coincident with the mechanical axis of the lens. By providing the first lens centration mark 30 on the first major surface 12 of lens 10, the centration of the first major surface 12 with the mechanical axis of the lens 10 may be determined.

Figure 9:
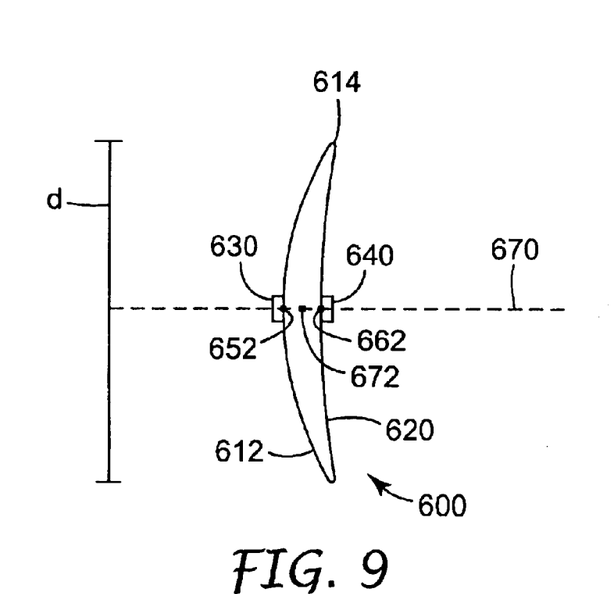
FIG. 9 is a schematic cross-section view of a lens having a first lens centration mark and a second lens centration mark according to one embodiment of the present invention.

Although lens 10 illustrated in FIGS. 1A–1B includes a first lens centration mark 30, the lenses of the present invention may also include a second lens centration mark on a second major surface of the lens. For example, FIG. 9 illustrates lens 600 having a first lens centration mark 630 and a second lens centration mark 640 according to another embodiment of the present invention. Lens 600 exhibits several features that are similar to those of lens 10 illustrated in FIGS. 1A–1B and described herein. Lens 600 includes a first major surface 612, a second major surface 620, and an outer edge 614. Lens 600 may be made of the same or similar materials as those used to manufacture lens 10.

Both the first and second major surfaces 612 and 620 may include any suitable shape known in the art, e.g., convex, concave, or planar. For convex and concave shapes, the first and second major surfaces 612 and 620 may take any suitable shape, e.g., spherical, or aspherical. As illustrated in FIG. 9, first major surface 612 is rotationally symmetrical about an axis 670. In other words, first major surface 612 may be described by rotating a non-circular curve about axis 670 (i.e., the axis of revolution) to form a surface of revolution. Axis 670 intersects the first major surface 612 at vertex 652.

In the embodiment illustrated in FIG. 9, the second major surface 620 is also rotationally symmetrical about axis 670 such that the second major surface 620 is a surface of revolution about axis 670 (i.e., the axis of revolution). The axis 670 intersects the second major surface 620 at vertex 662.

In the embodiment illustrated in FIG. 9, lens 600 has a diameter d, the midpoint of which, along with the midpoint of the distance between the first major surface 612 and the second major surface 620, define the geometrical center 672 of the lens 600. The geometrical center 672 in turn defines the mechanical axis, which is an axis that is orthogonal to the lens diameter d and intersects the geometrical center 672 of lens 600. In this embodiment, the mechanical axis is coincident with axis 670.

As illustrated in FIG. 9, the axes of revolution of the first major surface 612 and second major surface 620 are coincident with the mechanical axis of the lens 600 such that all three axes are depicted as axis 670. In an ideal lens, it may be preferred that these three axes are coincident such that the lens does not exhibit decentration. In other words, it may be preferred that the first lens centration mark 630 and the second lens centration mark 640 are both aligned with the mechanical axis of the lens (i.e., axis 670).

Figure 2A:
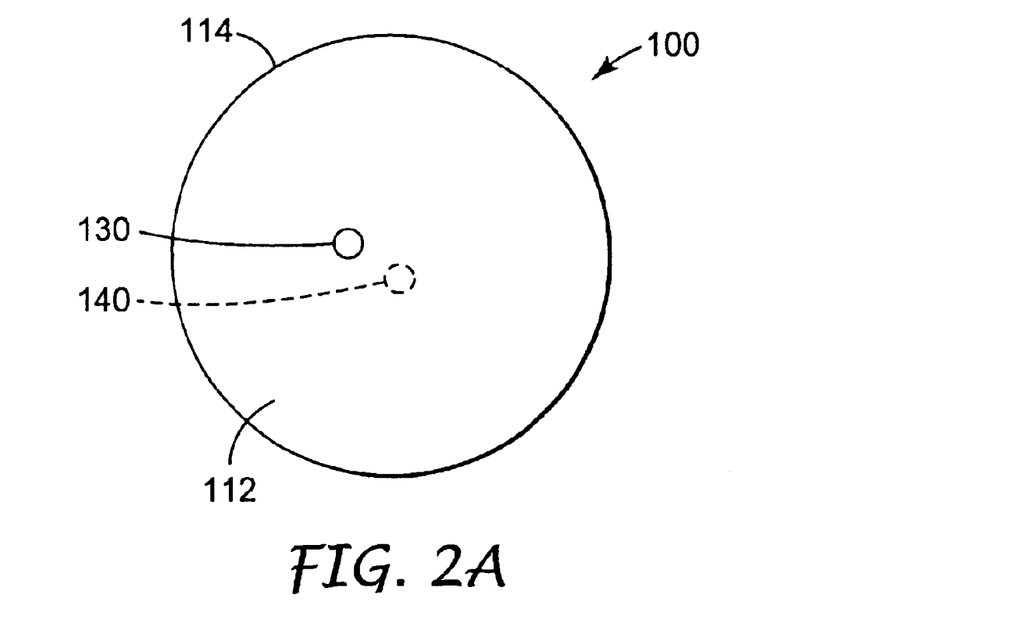
FIG. 2A is a schematic plan view of a lens having a first lens centration mark and a second lens centration mark according to one embodiment of the present invention.
Figure 2B:
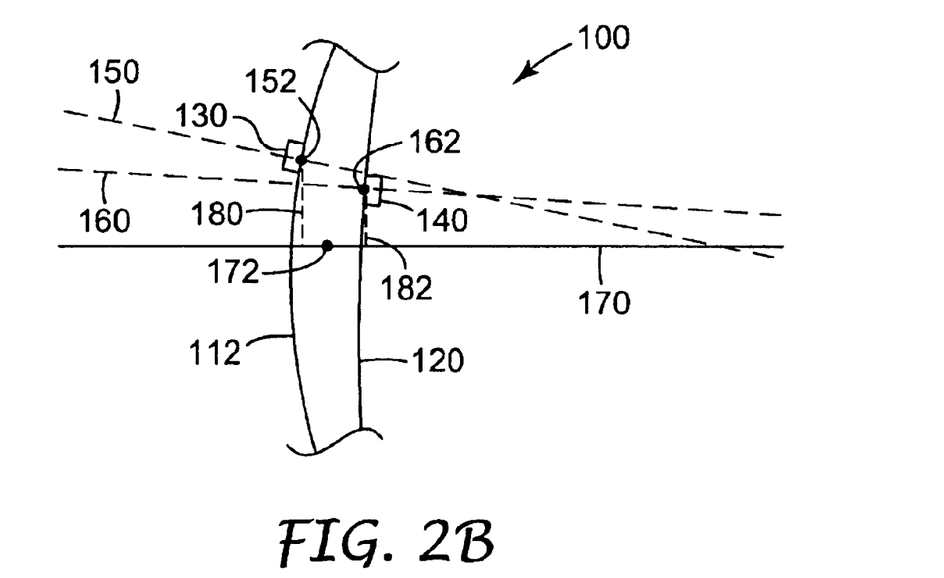
FIG. 2B is a schematic cross section view of a portion of the lens of FIG. 2A.

However, some lenses may exhibit decentration of at least one lens surface. For example, FIGS. 2A–2B illustrate another embodiment of a lens 100 according to the present invention. Lens 100 is similar in many respects to lens 10 of FIGS. 1A–1B and lens 600 of FIG. 9. Lens 100 includes a first major surface 112, a second major surface 120, and an outer edge 114.

As illustrated in FIG. 2B, first major surface 112 is rotationally symmetrical about a first axis 150. In other words, first major surface 112 may be considered to be a surface of revolution described by rotating a non-circular curve about first axis 150 (i.e., the axis of revolution). First axis 150 intersects the first major surface 112 at vertex 152.

Similarly, as illustrated in FIG. 2B, the second major surface 120 is symmetrical about a second axis 160 such that second major surface 120 is a surface of revolution. Second axis 160 intersects the second major surface 120 at vertex 162.

Located at the intersection of the first axis 150 and the first major surface 112 (i.e., at the vertex 152) is a first lens centration mark 130. As described herein with reference to first lens centration mark 30 of FIGS. 1A–1B, first lens centration mark 130 may be any suitable shape and size. It may be preferred that first lens centration mark 130 is of a size such that it does not substantially affect the optical properties of the lens 100. The first lens centration mark 130 may be used to determine the centration of the first major surface 112 of lens 100 as is further described herein.

Lens 100 further includes a second lens centration mark 140 located at the intersection of the second axis 160 and the second major surface 120 (i.e., at vertex 162). As stated in regard to the first lens centration mark 30 of FIGS. 1A–1B, the second lens centration mark 140 can take any suitable shape and size. The second lens centration mark 140 can be used to determine the centration of the second major surface 120 of lens 100 as is further described herein.

FIG. 2A is a schematic plan view of the lens 100 looking down on the first major surface 112. Although FIG. 2A shows the first lens centration mark 130 as being non-aligned with the second lens centration mark 140 along an axis orthogonal to the plane of FIG. 2A, the first lens centration mark 130 and the second lens centration mark 140 may be aligned such that the first axis 150 and the second axis 160 of FIG. 2B are coincident (see, e.g., lens 600 of FIG. 9).

Lens 100 further includes a geometrical center 172 that, in turn, defines the mechanical axis 170, which is an axis that is orthogonal to the lens diameter and intersects the geometrical center 172.

In an ideal lens, it may be preferred that the first lens centration mark 130 of the first major surface 112 and the second lens centration mark 140 of the second major surface 120 both are aligned with the mechanical axis 170 of the lens 100. Such alignment may ensure that the optical axis (i.e., first axis 150 and second axis 160) is coincident with the mechanical axis 170. In a system of one or more lenses, alignment of the surfaces of each lens may help to reduce image processing errors, such as coma, astigmatism, field tilt, decentration, and other aberrations known in the art.

In some embodiments of the present invention, the centration of the first major surface 112 can be compared to the centration of the second major surface 120 to determine the curve to curve decentration of lens 100. This curve to curve decentration can be determined using any suitable technique.

Errors may occur during the manufacturing of a lens that causes one or both surfaces of a lens to become decentered from the lens's mechanical axis. For example, both the first major surface 112 and the second major surface 120 of lens 100 are decentered from the mechanical axis 170. It may be preferred that the lenses of the present invention have at least one lens surface that is centered along the lens's mechanical axis. It may be more preferred that both surfaces of a lens of the present invention be centered along the lens's mechanical axis. In other words, it may be preferred that the first axis 150 (i.e., the optical axis) of the first major surface 112 is substantially coincident with the mechanical axis 170 of lens 100. Similarly, it may be preferred that the second axis 160 is substantially coincident with the mechanical axis 170. It may be more preferred that both the first axis 150 and the second axis 160 are substantially coincident with the mechanical axis 170. In other words, it may be preferred that the first lens centration mark 130 and the second lens centration mark 140 are aligned with the mechanical axis 170.

In FIG. 2B, the first major surface 112 is decentered such that the first axis 150 (i.e., the axis of revolution of the first major surface 112) is not coincident with the mechanical axis 170. Because the first lens centration mark 130 is located at the vertex 152 of the first major surface 112, the total distance 180 that the first major surface 112 is decentered from the mechanical axis 170 can be measured from the center of the first lens centration mark 130 (i.e., the vertex 152) to the mechanical axis 170. This distance 180 is the decentration of the first major surface 112. Similarly, the decentration 182 of the second major surface 120 can be measured from the center of the second lens centration mark 140 (i.e., the vertex 162) to the mechanical axis 170. As previously described, it may be preferred that the decentration 180 and 182 of both the first and second major surfaces 112 and 120 be as small as possible to reduce the likelihood of optical aberrations caused by decentration.

The lenses described herein can be made of any suitable materials and manufactured using any suitable techniques. It may be preferred that the lenses utilized with the methods of the present invention be made of polymeric material or materials and manufactured using an injection molding process. One embodiment of an apparatus for injection molding lenses is described in reference to FIGS. 3A–3B. Generally, an apparatus 200 for injection molding lenses includes a mold 210 placed between two platens 250 that press the mold 210 together with the aid of a clamping unit 252. A curable material 272 in raw form is fed into a hopper 270, which feeds the material into an injection unit 260. Heat bands 262, which surround the injection unit 260 heat the curable material 272 until it is in molten form 274. The injection unit 260 injects the molten material 274 into the mold 210.

Figure 3A:
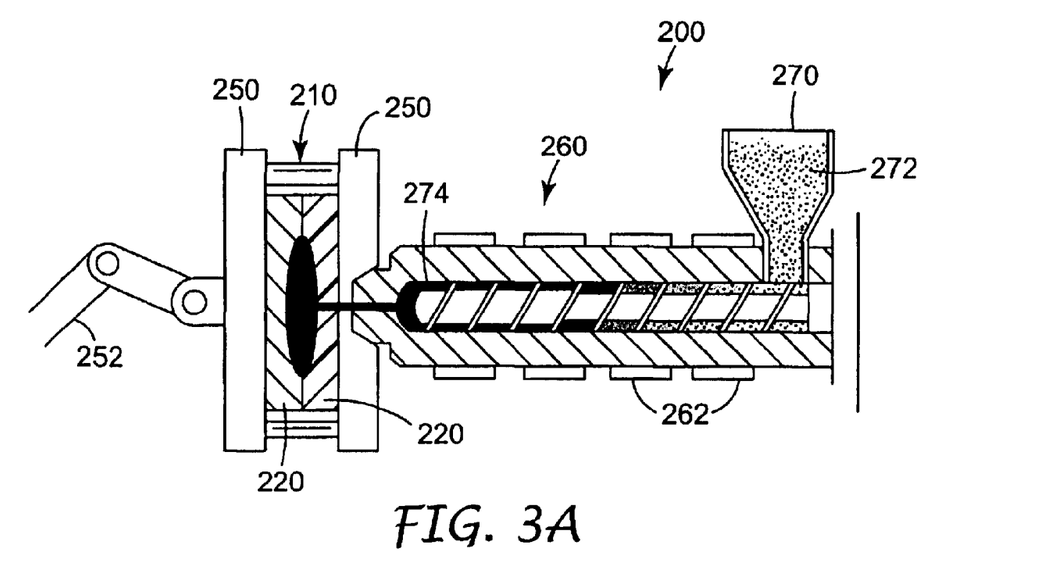
FIG. 3A is a schematic cross-section view of a lens mold apparatus including a lens mold according to one embodiment of the present invention.
Figure 3B:
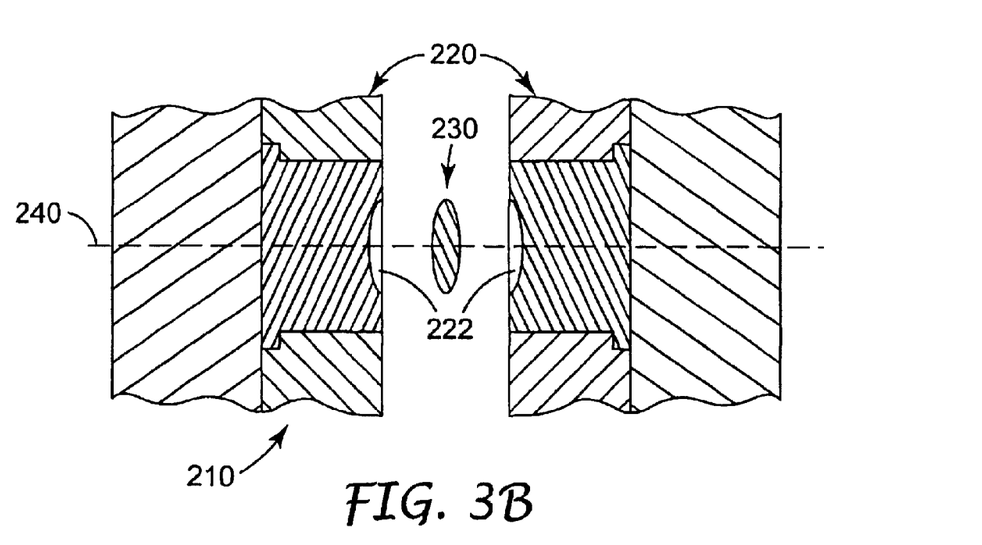
FIG. 3B is a schematic cross-section view of the lens mold of FIG. 3A.

The mold 210 includes one or more mold pins 220. Each mold pin 220 includes a mold surface 222 that is shaped to form the desired type of lens surface. For example, for aspherical lenses, the mold surface 222 may include an aspherical surface described by rotating a curve about an axis of revolution 240. After the injection unit 260 injects the molten material 274 into the mold 210, the molten material 274 is cured to form lens 230. Although FIGS. 3A–3B depict one general embodiment of an apparatus and technique for injection molding a lens, those skilled in the art will understand that the lenses and methods of forming and using such lenses described herein can be made using any suitable technique known in the art.

Figure 4:
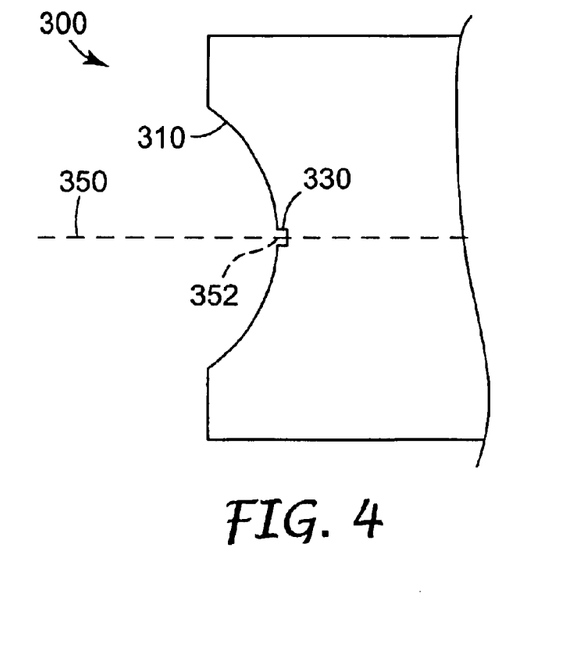
FIG. 4 is a schematic cross-section view of a mold pin having a mold centration mark according to one embodiment of the present invention.

FIG. 4 is a cross-section view of one mold pin 300 according to one embodiment of the present invention. Mold pin 300 may be used with any suitable injection molding apparatus known in the art, e.g., apparatus 200 of FIG. 3A. The mold pin 300 includes a first mold pin surface 310 that is rotationally symmetrical about a first mold pin axis 350. The mold pin 300 may be manufactured using any suitable material or materials, e.g., steel, aluminum, nickel, stainless steel, copper alloys, etc. The first mold pin surface 310 may be any suitable shape for forming a desired type of lens, e.g., convex, concave, or planar. Further, convex and concave surfaces may take spherical or aspherical shapes.

The first mold pin surface 310 includes a vertex 352 that is the point at which the first mold pin axis 350 intersects the outline of the first mold pin surface 310. The first mold pin surface 310 also includes a first mold centration mark 330 formed at the vertex 352. The first mold centration mark 330 may include any suitable shape, e.g., circular, triangular, rectangular. Further, the first mold centration mark 330 can be a bump or protuberance that extends from the first mold pin surface 310. Alternatively, the first mold centration mark 330 can be a dimple or depression that extends into the first mold pin surface 310. The first mold centration mark 330 is generally the reverse image of the lens centration mark to be formed on a surface of a lens that is to be manufactured using the mold pin 300 (e.g., first lens centration mark 30 of lens 10 of FIGS. 1A–1B).

The first mold centration mark 330 may be formed using any suitable technique known in the art, e.g., engraving, embossing, etching, laser ablation, vacuum coating, etc. It may be preferred that the first mold centration mark 330 is formed by engraving. For example, the mold pin 300 can be placed on a rotating chuck and rotated as the first surface 310 is contacted with an engraving tool, e.g., a diamond tipped probe, tool steel, cubic boron nitride, etc.

In an injection molding process, one or both mold pins can have a mold centration mark formed on the pin's surface at its vertex.

Figure 5:
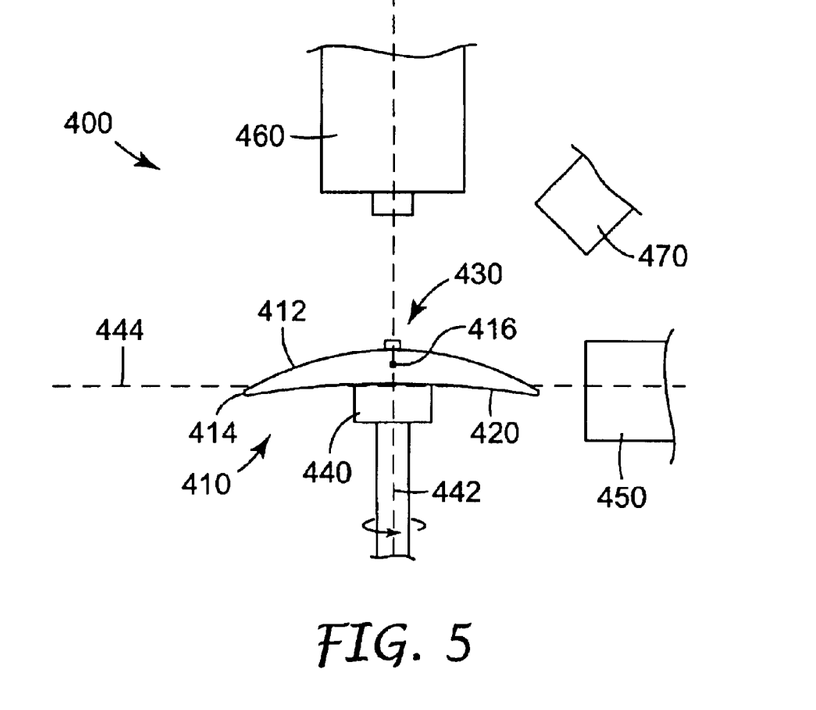
FIG. 5 is a schematic diagram of a centration measurement system for measuring centration of a lens having at least one lens centration mark according to one embodiment of the present invention.

Several methods can be used to measure the centration of one or more surfaces of the lens. FIG. 5 is a schematic diagram of one embodiment of a centration measurement system 400 according to the present invention. The system 400 includes a platen 440 that rotates about a rotation axis 442. The platen 440 may rotate either clockwise or counterclockwise. A lens 410 (e.g., lens 100 of FIG. 2A) is placed on platen 440 such that both the platen 440 and the lens 410 rotate about the rotation axis 442.

The lens 410 may be similar to other lenses described herein. The lens 410 includes a first major surface 412, a second major surface 420, an outer edge 414, and a geometrical center 416. Further, the first major surface 412 includes a first lens centration mark 430 at a vertex (not shown) of the first major surface of the lens 410. Although depicted as having only a first lens centration mark 430, the lens 410 may further include a second lens centration mark on the second major surface 420 as further described herein (e.g., second lens centration mark 140 of lens 100 of FIGS. 2A–2B).

Adjacent the platen 440 is a moment indicator 450. The moment indicator 450 may be any suitable indicator, e.g., the Formscan 3100 made by Mahr Federal (Providence, R.I., USA). The moment indicator 450 is operable to measure runout of the lens 410 as the lens 410 and platen 440 rotate. For example, the moment indicator 450 may include a spring-loaded probe that contacts the lens 410 and detects movement of the lens 410 in a plane of rotation 444 as the lens 410 rotates.

The system 400 further includes a microscope 460 including a light source 470. The microscope 460 may be any suitable microscope, e.g., a 100 power microscope having an eyepiece with a cross-hair. Further, the light source 470 may be any suitable light source for illuminating the lens 410 for viewing in the microscope 460, e.g., a ¼ inch fiber optic bundle with a fiber optic illuminator. Together, the microscope 460 and the light source 470 are operable to focus on the first lens centration mark 430 of the first major surface 412 of the lens 410. Further, if the lens 410 includes a second lens centration mark on the second major surface 420, then the microscope 460 is operable to focus through lens 410 and onto the second lens centration mark. The microscope 460 is positionable such that it is aligned along the rotation axis 442 of platen 440. The microscope 460 may also include an indicator (not shown) that is operable to measure the distance the microscope travels in a plane parallel to the plane of rotation 444 as is further described herein.

A method for measuring the centration of a lens including at least one lens centration mark will now be described in reference to FIGS. 5–7. Lens 410, which includes first lens centration mark 430 on first major surface 412, is placed on the platen 440. The lens 410 is leveled relative to the plane of rotation 444. The plane of rotation 444 is orthogonal to the rotation axis 442. The lens 410 may be leveled using any suitable technique known in the art. Further, the platen 440 may include a mechanism for aiding in leveling the lens 410 on the platen 440. Further, the apparatus 400 may include a controller and software that aid in leveling and centering lens 410 on platen 440.

The lens 410 is placed such that the first lens centration mark 430 is aligned with the rotation axis 442 of the platen 440. Any suitable technique of placing the first lens centration mark 430 on the rotation axis 442 may be utilized. For example, the lens 410 may be placed on the platen 440 and the platen 440 rotated while the lens 410 is observed through the microscope 460. If the first lens centration mark 430 is aligned with the rotation axis 442, then the mark 430 will remain substantially stationary in the plane of rotation 444 as the lens 410 and platen 440 rotate. If, however, the first lens centration mark 430 does not remain stationary, then the lens 410 is repositioned on the platen 440 and once again the lens 410 and platen 440 are rotated as the lens 410 is observed through the microscope 460. This process may be repeated any number of times until the first lens centration mark 430 remains stationary in the plane of rotation 444 as the lens 410 and platen 440 are rotated.

Once the lens 410 is leveled, the lens 410 and platen 440 are rotated about the rotation axis 442. As the lens 410 and platen 440 rotate, the lens 410 is observed to assess centration of the first major surface 412 of the lens 410. For example, the moment indicator 450 may measure a distance that the lens 410 travels in the plane of rotation 444 as the lens 410 rotates. This distance can be referred to as the Total Indicated Runout (TIR). If the vertex (indicated by the first lens centration mark 430) is aligned with the mechanical axis of the lens 410 (e.g., mechanical axis 170 of FIG. 2B), then the lens 410 will not travel back and forth in the plane of rotation 444 while the lens 410 rotates. In other words, if the axis of revolution (i.e., the optical axis) of the first major surface 412 and the mechanical axis are substantially coincident, then both the axis of revolution of the first major surface 412 and the mechanical axis are substantially coincident with the rotation axis 442, and the lens 410 will rotate about the rotation axis 442 without any runout.

If, on the other hand, the axis of revolution of the first major surface 412 of lens 410 is not substantially coincident with the mechanical axis, then the mechanical axis will rotate around the rotation axis 442 as the lens 410 rotates, and the outer edge 414 of the lens 410 will move back and forth in the plane of rotation 444, i.e., the lens 410 will exhibit runout. For example, in FIG. 6, the lens 410 is pictured at various positions in its motion about the rotation axis 442. Lens 410a illustrates lens 410 at a time $T_1$. At time $T_1$, lens 410a includes first lens centration mark 430 and geometrical center 416a. At time $T_2$, the lens 410b has traveled such that outer edge 414b is a distance 480 from a reference point 452. The reference point 452 may be a point fixed on the moment indicator 450. At time $T_2$, the geometrical center has moved from center 416a to center 416b while the first lens centration mark 430 has remained fixed because the first lens centration mark 430 is aligned with the rotation axis 442. At time $T_3$, the lens 410c has rotated clockwise from its position at $T_2$, such that the outer edge 414c of lens 410c is a distance 482 from reference point 452. The geometrical center of lens 410 has moved from center 416b to center 416c. This movement of the geometrical center as lens 410 rotates indicates that the mechanical axis is rotating around the rotation axis 442. This movement of the geometrical center 416 as well as the outer edge 414 of the lens 410 indicates that the first major surface 412 of lens 410 is decentered from the mechanical axis of the lens.

Figure 6:
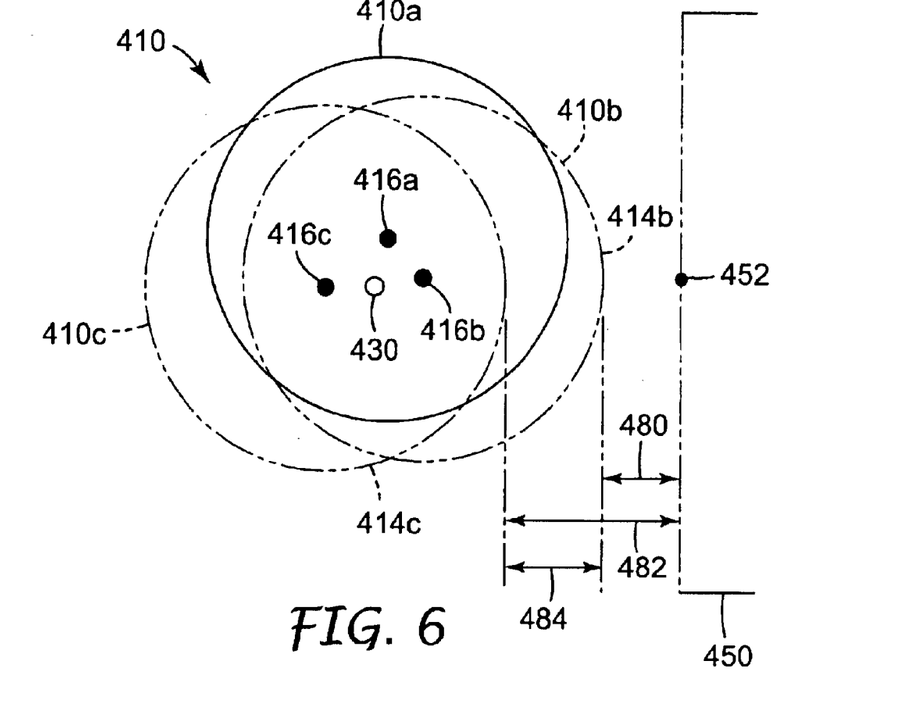
FIG. 6 is a schematic top plan view of the lens of FIG. 5 shown in several rotated positions.
Figure 7:
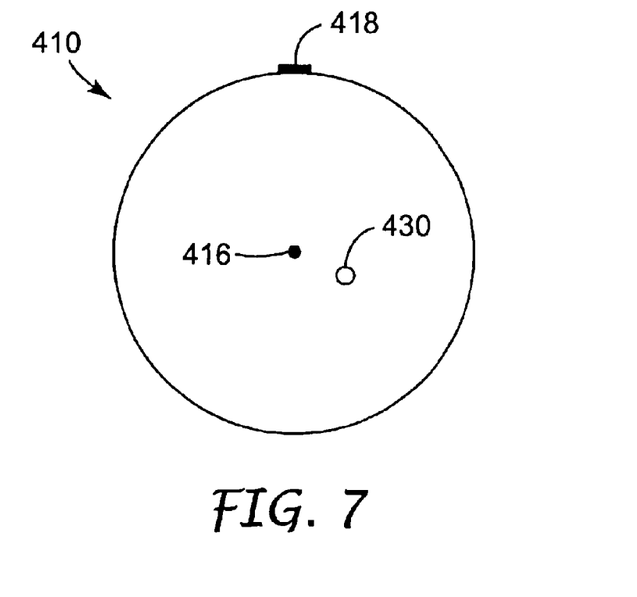
FIG. 7 is a schematic top plan view of one embodiment of the lens of FIG. 5.

As illustrated in FIG. 6, distance 480 is the minimum distance from the edge 414 of lens 410 to reference point 452, and distance 482 is the maximum distance from edge 414 to reference point 452. The total indicated runout (TIR) of the lens 410 may be determined by comparing the maximum distance 482 with the minimum distance 480 using any suitable technique known in the art. For example, the minimum distance 480 may be subtracted from the maximum distance 482 to provide TIR 484. To determine the amount of decentration, the TIR is divided in half. This provides the runout of the first major surface 412 of lens 410.

The above-described method may also be used to determine the direction of the decentration such that adjustments may be made to the mold. For example, FIG. 7 illustrates another embodiment of lens 410 of FIGS. 5–6, where lens 410 further includes a gate protrusion 418. The gate protrusion 418 is formed from the gate on the injection mold apparatus when the lens 410 is manufactured. The gate protrusion 418 may be used as a reference mark to determine the direction in which the lens 410 may have become decentered. Although the gate protrusion 418 may be used as a reference, other techniques of defining a reference may be used.

As the lens 410 and platen 440 are rotated, the operator determines the location of the gate protrusion 418 and sets that as a reference. The moment indicator 450 then determines the direction of the runout from the position of the gate protrusion 418 when the lens is at either the maximum distance 482 or the minimum distance 480 from the reference point 452.

After determining the runout and location of runout of lens 410, the centration of the second major surface 420 can be determined using a second lens centration mark that is located on the second major surface 420 (e.g., the second lens centration mark 140 of lens 100 of FIGS. 2A–2B). The microscope 460 is focused through the first major surface 410 of lens 400 and onto the second lens centration mark on the second major surface 420 and the second lens centration mark is positioned such that it is on the rotation axis 442. The above-mentioned method is then repeated to determine the runout of the second major surface 420 of lens 410. Further, the direction of the runout of the second major surface 420 may also be determined using the techniques described herein.

Another method for determining the centration of one or more surfaces of a lens having at least one lens centration mark will now be described in reference to FIG. 5. The lens 410 is centered on the platen 440 such that a geometrical center 416 of the lens is aligned with the rotation axis 442. Any suitable technique may be used to mechanically center the lens on the platen 440. For example, U.S. Pat. No. 5,835,208 describes a method for mechanically centering a lens. The microscope 460 is focused on the first lens centration mark 430 such that crosshairs of the microscope 460 are centered on the mark 430. The platen 440 and lens 410 are rotated until the lens 410 is in a first lens position. If the first major surface 412 is decentered, then the first lens centration mark 430 will runout in a circular orbit around the rotation axis 442 as the lens 410 and platen 440 are rotated. An indicator in communication with the microscope 460 (not shown) is set to zero. The lens 410 and platen 440 are rotated to a second lens position such that the lens 410 rotates approximately 180 degrees from the first lens position. The microscope 460 is moved from the previous position until its crosshairs are once again centered on the first lens centration mark 430. The microscope's travel distance between the first lens position and second lens position is determined using the indicator. This distance is the TIR for the first major surface 412 of the lens 410. The microscope 460 may then be focused through the first major surface 412 to a second lens centration mark on the second major surface 420 to determine the centration of the second major surface 420 using the above-described method or any other suitable technique known in the art.

Figure 8:
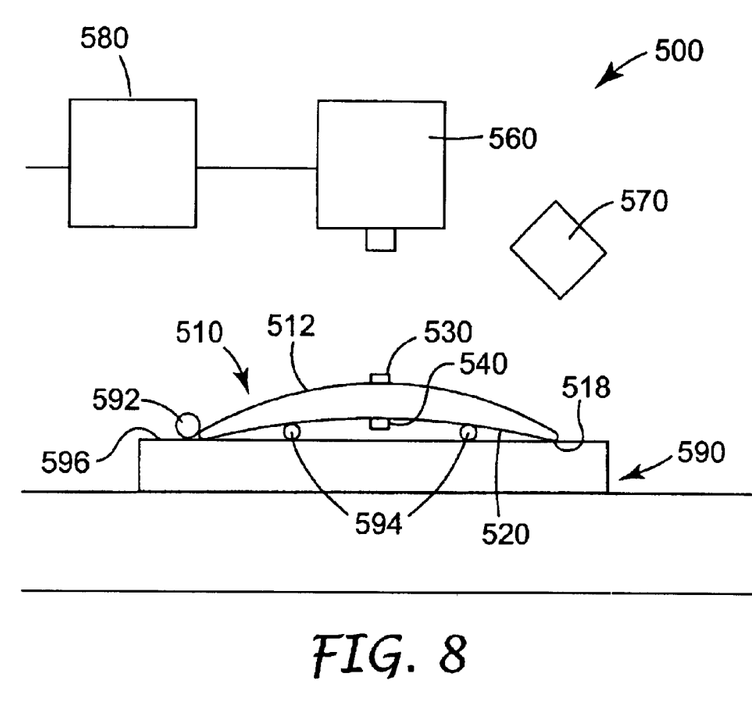
FIG. 8 is a schematic diagram of another centration measurement system for measuring centration of a lens having at least one lens centration mark according to one embodiment of the present invention.

FIG. 8 is a schematic diagram of another embodiment of a lens centration system 500 according to the present invention. Lens centration system 500 is similar to lens centration system 400 of FIG. 5. For example, lens centration system 500 includes platen 590. A lens 510 having at least one lens centration mark 530 may be placed on a surface 596 of the platen 590. The system 500 further includes a microscope 560 and a light source 570.

In communication with microscope 560 is an optical coordinate measuring machine (CMM) 580. The CMM 580 may be any suitable CMM known the art, e.g., the Avant Apex video measuring system manufactured by Optical Gaging Products, Inc. (Rochester, N.Y., USA). The CMM 580 is operable to communicate with microscope 560 such that the CMM 580 can determine the coordinates of one or more locations on a surface. Any suitable coordinate system may be used, e.g., Cartesian, polar, etc. The CMM 580 may include a controller and software for controlling the microscope 560 and determining such coordinates of one or more locations.

A method of measuring the centration of a lens will now be described in reference to FIG. 8. Lens 510 is placed on the surface 596 of the platen 590 in a first lens position such that the first lens centration mark 530 is facing the microscope 560. The lens 510 can be placed such that its geometrical center is centered on the platen 590. It may be preferred that the lens 510 is centered on the platen 590 such that the geometrical center of the lens 510 can be used as a reference in determining the locations of the first lens centration mark 530 as described herein. The lens 510 can be centered on the platen 590 using the lens's mounting surfaces, which may be the lens's diameter and either a second major surface 520 of lens 510 or an edge flat 518 of the lens 510. The diameter of lens 510 can be located by placing the lens against post 592. Although only one post 592 is illustrated in FIG. 8, two or more posts 592 may be utilized to center lens 510 on platen 590. Further, any suitable posts or other device for locating the diameter of the lens 510 may be used. Alternatively, if the second major surface 520 of lens 510 is the mounting surface, then the lens 510 can be placed on posts 594 such that lens 510 is level in relation to platen 590. Although system 500 utilizes either posts 592 or 594 to center lens 510 on platen 590, any suitable technique or device may be used to center lens 510.

The CMM 580 determines a first location of the first lens centration mark 530 in this first lens position. In other words, the CMM 580 determines the coordinates (e.g., Cartesian, polar, etc.) of the first lens centration mark 530 in the first lens position and stores such coordinates for later reference. The microscope 560 may be used to aid the CMM 580 in determining the first location of the first lens centration mark 530 by focusing the microscope 560 onto the mark 530.

The lens 510 is then positioned in a second lens position. It may be preferred that the second lens position is an approximately 180 degree rotation of the lens 510 about the geometrical center of the lens 510 such that the lens 510 is centered on the platen 590.

After the lens 510 is positioned in the second lens position, the CMM 580 determines a second location of the first lens centration mark 530 by finding the coordinates of the first lens centration mark 530. This second location is compared to the first location to determine the TIR of the first major surface 512 of lens 510 using any suitable technique known in the art. If the first lens centration mark 530 is aligned with the mechanical axis of the lens 510, then the first location and the second location of the first lens centration mark 530 should be substantially identical. In other words, the coordinates of the first lens centration mark 530 in the first lens position and the coordinates of the first lens centration mark 530 in the second lens position should be substantially the same. However, if these two sets of coordinates are different, then the CMM 580 determines the TIR of the first major surface 512 using techniques known the art. Further, the CMM 580 is operable to determine the direction of any TIR of the first major surface using any suitable technique further described herein.

The centration of the second major surface 520 can also be measured using the above-described techniques. In some embodiments, the coordinates of both the first lens centration mark 530 and a second lens centration mark 540 can be determined while the lens 510 is in the first lens position, and then the coordinates of marks 530 and 540 can be determined when the lens 510 is in the second lens position.

Although the methods described above are applied to a single lens, such methods may also be used to determine the centration of two or more lenses in an optical assembly relative to the mechanical axis of the assembly. For example, a microscope with a long working distance objective may be used to focus through the two or more lenses of the assembly. The assembly is mounted on an adjustable stage so that the mechanical axis or the optical axis of each lens is coincident with the axis of the microscope. If a lens is decentered, then that particular lens's centration mark will be displaced from the cross-hair of the microscope.

All references and publications cited herein are expressly incorporated herein by reference in their entirety into this disclosure. Illustrative embodiments of this invention are discussed and reference has been made to possible variations within the scope of this invention. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below.

What is claimed is:

1. A method of measuring centration of a lens, the method comprising:

placing the lens on a platen, wherein the lens comprises a first major surface and a second major surface, wherein the first major surface is rotationally symmetrical about a first axis, and further wherein the first major surface comprises a first lens centration mark located at the intersection of the first major surface and the first axis, wherein placing the lens on the platen comprises placing the lens on the platen such that the first lens centration mark is aligned with a rotation axis of the platen;

leveling the lens relative to a plane of rotation that is orthogonal to the rotation axis of the platen;

rotating the lens about the rotation axis of the platen; and observing the lens during or alter rotation to assess centration of the first major surface of the lens.

2. The method of claim 1, wherein assessing centration of the first major surface of the lens comprises:

measuring a maximum distance from a reference point to an outer edge of the lens as the lens rotates;

measuring a minimum distance from the reference point to the outer edge of the lens as the platen and lens rotate; and comparing the minimum distance and the maximum distance.

3. The method of claim 1, wherein the method further comprises:

repositioning the lens on the platen such that a second lens centration mark on a second major surface of the lens is aligned with the rotation axis of the platen, wherein the second major surface of the lens is rotationally symmetrical about a second axis, wherein the second lens centration mark is located at the intersection of the second major surface and the second axis;

rotating the lens about the rotation axis of the platen; and observing the lens during or after rotation to assess centration of the second major surface of the lens.

4. The method of claim 3, wherein assessing centration of the second major surface of the lens comprises:

measuring a second maximum distance from the reference point to the outer edge of the lens as the lens rotates;

measuring a second minimum distance from the reference point to the outer edge of the lens as the lens rotates; and comparing the second minimum distance and the second maximum distance.

5. The method of claim 2, wherein the lens further comprises a gate protrusion disposed on the outer edge of the lens, wherein the method further comprises assessing the direction of decentration of the first major surface of the lens.

6. The method of claim 5, wherein assessing the direction of decentration of the first major surface of the lens comprises determining the direction from one of the minimum distance and the maximum distance to the gate protrusion.

7. The method of claim 4, wherein the lens further comprises a gate protrusion disposed on the outer edge of the lens, wherein the method further comprises assessing the direction of decentration of the second major surface of the lens.

8. The method of claim 7, wherein assessing the direction of decentration of the second major surface of the lens comprises determining the direction from one of the second minimum distance and the second maximum distance to the gate protrusion.

9. The method of claim 1, wherein the first lens centration mark comprises a diameter of no more than 50 µm.

10. The method of claim 1, wherein the first major surface of the lens comprises an aspherical shape.

11. The method of claim 10, wherein the second major surface of the lens comprises an aspherical shape.

12. The method of claim 3, wherein the second lens centration mark comprises a diameter of no more than 50 µm.

13. The method of claim 3, wherein the second major surface of the lens comprises an aspherical shape.

* * * * *

UNITED STATES PATENT AND TRADEMARK OFFICE
CERTIFICATE OF CORRECTION

PATENT NO. : 6,951,392 B2  Page 1 of 1
DATED : October 4, 2005
INVENTOR(S) : Jones, Edward L.

It is certified that error appears in the above-identified patent and that said Letters Patent is hereby corrected as shown below:

<u>Title page,</u>
Item [56], References Cited, OTHER PUBLICATIONS,
"OGP Avant Apex Video Measuring System", reference, after "<http://" insert
-- www. --;
"Melles Griot Optics GuideCentration" reference, after "<http://" insert -- www. --.

<u>Column 2,</u>
Line 40, after "about a" delete ",".

<u>Column 14,</u>
Line 56, delete "alter" and insert -- after --.

Signed and Sealed this

Twenty-first Day of March, 2006

JON W. DUDAS
*Director of the United States Patent and Trademark Office*